(12) United States Patent
Toda (10) Patent No.: US 12,491,901 B2
(45) Date of Patent: Dec. 9, 2025

(54) DRIVING ASSISTANCE DEVICE AND DRIVING ASSISTANCE METHOD

(71) Applicant: HONDA MOTOR CO., LTD., Tokyo (JP)

(72) Inventor: Kosuke Toda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 18/371,491

(22) Filed: Sep. 22, 2023

(65) Prior Publication Data

US 2024/0101136 A1 Mar. 28, 2024

(30) Foreign Application Priority Data

Sep. 26, 2022 (JP) ................... 2022-152420

(51) Int. Cl.
*B60W 50/14* (2020.01)
*G06F 3/16* (2006.01)

(52) U.S. Cl.
CPC ............ *B60W 50/14* (2013.01); *G06F 3/165* (2013.01); *B60W 2050/143* (2013.01)

(58) Field of Classification Search
CPC . B60W 50/14; B60W 2050/143; G06F 3/165; G06F 3/167

See application file for complete search history.

(56) References Cited

U.S. PATENT DOCUMENTS

2014/0277653 A1* 9/2014 Watts ................ G06F 3/165
700/94
2017/0287217 A1 10/2017 Kim et al.
2020/0003917 A1* 1/2020 Maeda ................ G06F 3/16
2020/0244242 A1* 7/2020 Bongiovi ............ H03G 5/165

FOREIGN PATENT DOCUMENTS

| CN | 113548063 A | * 10/2021 | ............ B60Q 9/00 |
|---|---|---|---|
| JP | 2015-191429 | 11/2015 | |
| JP | 2017-102863 | 6/2017 | |
| JP | 2021-174505 | 11/2021 | |

OTHER PUBLICATIONS

Japanese Office Action for Japanese Patent Application No. 2022-152420 mailed Jul. 15, 2025.

* cited by examiner

*Primary Examiner* — Rufus C Point
(74) *Attorney, Agent, or Firm* — Amin, Turocy & Watson, LLP (57) ABSTRACT

A driving assistance device includes a storage medium configured to store computer-readable instructions, and a processor connected to the storage medium, in which the processor executes the computer-readable instructions to determine whether to urge a driver of a mobile object to accelerate or decelerate on the basis of a state of the mobile object, to cause a speaker to output a notification sound urging the driver of the mobile object to accelerate or decelerate on the basis of a result of the determination, to cause the speaker to output a fundamental sound when causing the speaker to output the notification sound, and then cause the speaker to output one or more additional sounds whose pitch is different from a pitch of the fundamental sound, and to cause the speaker to output the one or more additional sounds whose pitch is higher than the pitch of the fundamental sound when the driver of the mobile object is urged to accelerate.

20 Claims, 9 Drawing Sheets

| URGENT SITUATION NO. | CORRESPONDING CONDITIONS |
|---|---|
| 1 | DISTANCE TO PRECEDING VEHICLE ON STRAIGHT ROAD/RELATIVE SPEED IS LESS THAN THRESHOLD VALUE Th1 |
| 2 | DISTANCE TO FOLLOWING VEHICLE ON STRAIGHT ROAD/RELATIVE SPEED IS LESS THAN THRESHOLD VALUE Th2 |
| 3 | DISTANCE TO FOLLOWING VEHICLE AFTER PASSING THROUGH INTERSECTION/RELATIVE SPEED IS LESS THAN THRESHOLD VALUE Th3 |
| 4 | DISTANCE TO FOLLOWING VEHICLE AFTER MERGING/RELATIVE SPEED IS LESS THAN THRESHOLD VALUE Th4 |
| ... | ... |

DRIVING ASSISTANCE DEVICE AND DRIVING ASSISTANCE METHOD

CROSS-REFERENCE TO RELATED APPLICATION

Priority is claimed on Japanese Patent Application No. 2022-152420, filed Sep. 26, 2022, the content of which is incorporated herein by reference.

BACKGROUND

Field of the Invention

The present invention relates to a driving assistance device and a driving assistance method.

Description of Related Art

Conventionally, an invention of a driving assistance device is disclosed, which includes a determination unit configured to determine a target relative position with respect to other vehicles for entering a destination lane, which is a merging destination or a lane change destination, based on a result of detection of the other vehicles traveling in the destination lane, and a notification control unit configured to cause a speaker to output a different notification sound depending on whether a host vehicle is required to accelerate or to decelerate to perform an alignment in a vehicle traveling direction with respect to the target relative position determined by the determination unit (Japanese Unexamined Patent Application, First Publication No. 2021-174505).

SUMMARY

Conventional inventions are suitable for specific situations such as merging and lane changes. There are various other situations in which mobile objects such as vehicles travel, and there may be situations where it is appropriate to encourage acceleration or deceleration through other methods.

The present invention has been made in consideration of such circumstances, and one of the objects is to provide a driving assistance device and a driving assistance method capable of intuitively conveying guidance content of acceleration or deceleration to the driver.

The driving assistance device and driving assistance method according to this invention have the following configuration.

(1): A driving assistance device according to one aspect of the present invention includes a storage medium configured to store computer-readable instructions, and a processor connected to the storage medium, in which the processor executes the computer-readable instructions to determine whether to urge a driver of a mobile object to accelerate or decelerate on the basis of a state of the mobile object, to cause a speaker to output a notification sound urging the driver of the mobile object to accelerate or decelerate on the basis of a result of the determination, to cause the speaker to output a fundamental sound when causing the speaker to output the notification sound, and then cause the speaker to output one or more additional sounds whose pitch is different from a pitch of the fundamental sound, and to cause the speaker to output the one or more additional sounds whose pitch is higher than the pitch of the fundamental sound when the driver of the mobile object is urged to accelerate.

(2): A driving assistance device according to another aspect of the present invention includes a storage medium configured to store computer-readable instructions, and a processor connected to the storage medium, in which the processor executes the computer-readable instructions to determine whether to urge a driver of a mobile object to accelerate or decelerate on the basis of a state of the mobile object, to cause a speaker to output a notification sound urging the driver of the mobile object to accelerate or decelerate on the basis of a result of the determination, to cause the speaker to output a fundamental sound when causing the speaker to output the notification sound, and then cause the speaker to output one or more additional sounds whose pitch is different from the pitch of the fundamental sound, and to cause the speaker to output the one or more additional sounds whose pitch is lower than the pitch of the fundamental sound when the driver of the mobile object is urged to decelerate.

(3): In the aspect of (1) described above, the processor may cause the speaker to output one or more additional sounds whose pitch is different from the pitch of the fundamental sound while an output of the fundamental sound continues.

(4): In the aspect of (2) described above, the processor may cause the speaker to output one or more additional sounds whose pitch is different from the pitch of the fundamental sound while the output of the fundamental sound continues.

(5): In the aspect of (1) described above, the processor may cause the speaker to output the one or more additional sounds in order of the pitch closest to the pitch of the fundamental sound.

(6): In the aspect of (2) described above, the processor may cause the speaker to output the one or more additional sounds in the order of the pitch closest to the pitch of the fundamental sound.

(7): In the aspect of (5) described above, the processor may increase a pitch difference between the fundamental sound and one of the one or more additional sounds, the pitch of which is farthest from the pitch of the fundamental sound, as a degree to which to urge the driver of the mobile object to perform acceleration or deceleration increases.

(8): In the aspect of (6) described above, the processor may increase the pitch difference between the fundamental sound and one of the one or more additional sounds, the pitch of which is farthest from the pitch of the fundamental sound, as the degree to which to urge the driver of the mobile object to perform acceleration or deceleration increases.

(9): In the aspect of (5) described above, the notification control unit may increase the number of types of the one or more additional sounds as the degree to which to urge the driver of the mobile object to perform acceleration or deceleration increases.

(10): In the aspect of (6) described above, the notification control unit may increase the number of types of the one or more additional sounds as the degree to which to urge the driver of the mobile object to perform acceleration or deceleration increases.

(11): In the aspect of (5) described above, the notification control unit may shorten an interval of an output start timing of the fundamental sound and the one or more additional sounds as the degree to which to urge the driver of the mobile object to perform acceleration or deceleration increases.

(12): In the aspect of (6) described above, the notification control unit may shorten an interval of an output start timing of the fundamental sound and the one or more additional sounds as the degree to which to urge the driver of the mobile object to perform acceleration or deceleration increases.

(13): In the aspect of (5) described above, the fundamental sound and the one or more additional sounds may be sounds that fall within one octave.

(14): In the aspect of (6) described above, the fundamental sound and the one or more additional sounds may be sounds that fall within one octave.

(15): In the aspect of (1) described above, the processor may further set an urgency of a speed adjustment of the mobile object on the basis of information indicating a surrounding environment of the mobile object, cause the speaker to output the one or more additional sounds that are dissonant with the fundamental sound when the urgency is high, and cause the speaker to output the one or more additional sounds that are consonant with the fundamental sound when the urgency is low.

(16): In the aspect of (2) described above, the processor may further set an urgency of a speed adjustment of the mobile object on the basis of information indicating a surrounding environment of the mobile object, cause the speaker to output the one or more additional sounds that are dissonant with the fundamental sound when the urgency is high, and cause the speaker to output the one or more additional sounds that are consonant with the fundamental sound when the urgency is low.

(17): In the aspect of (15) described above, the notification control unit may shorten an output cycle of the notification sound when the urgency is high compared to when the urgency is low.

(18): In the aspect of (16) described above, the notification control unit may shorten the output cycle of the notification sound when the urgency is high compared to when the urgency is low.

(19): A driving assistance method according to still another aspect of the present invention includes determining whether to urge a driver of a mobile object to accelerate or decelerate on the basis of a state of the mobile object, causing a speaker to output a notification sound urging the driver of the mobile object to accelerate or decelerate on the basis of a result of the determination, causing the speaker to output a fundamental sound when causing the speaker to output the notification sound, and then causing the speaker to output one or more additional sounds whose pitch is different from a pitch of the fundamental sound, and causing the speaker to output the one or more additional sounds whose pitch is higher than the pitch of the fundamental sound when the driver of the mobile object is urged to accelerate.

(20): A driving assistance method according to still another aspect of the present invention includes determining whether to urge a driver of a mobile object to accelerate or decelerate on the basis of a state of the mobile object, causing a speaker to output a notification sound urging the driver of the mobile object to accelerate or decelerate on the basis of a result of the determination, causing the speaker to output a fundamental sound when causing the speaker to output the notification sound, and then causing the speaker to output one or more additional sounds whose pitch is different from a pitch of the fundamental sound, and causing the speaker to output the one or more additional sounds whose pitch is higher than the pitch of the fundamental sound when the driver of the mobile object is urged to accelerate.

According to the aspects of (1) to (20) described above, it is possible to intuitively inform the driver of guidance content of acceleration or deceleration.

DESCRIPTION OF EMBODIMENTS

Embodiments of a driving assistance device and a driving assistance method of the present invention will be described below with reference to the drawings. A driving assistance device is a device that assists with driving of a mobile object. A mobile object may include any mobile object with a person (driver) on board, including vehicles with three or four wheels, two-wheeled vehicles, micro-mobilities, and the like. In the first embodiment to be described below, a mobile object is assumed to be a four-wheeled vehicle, and a vehicle equipped with a driving assistance device is referred to as a vehicle M. In addition, in the second embodiment, the mobile object is assumed to be a two-wheeled vehicle.

First Embodiment

[Configuration]

Figure 1:
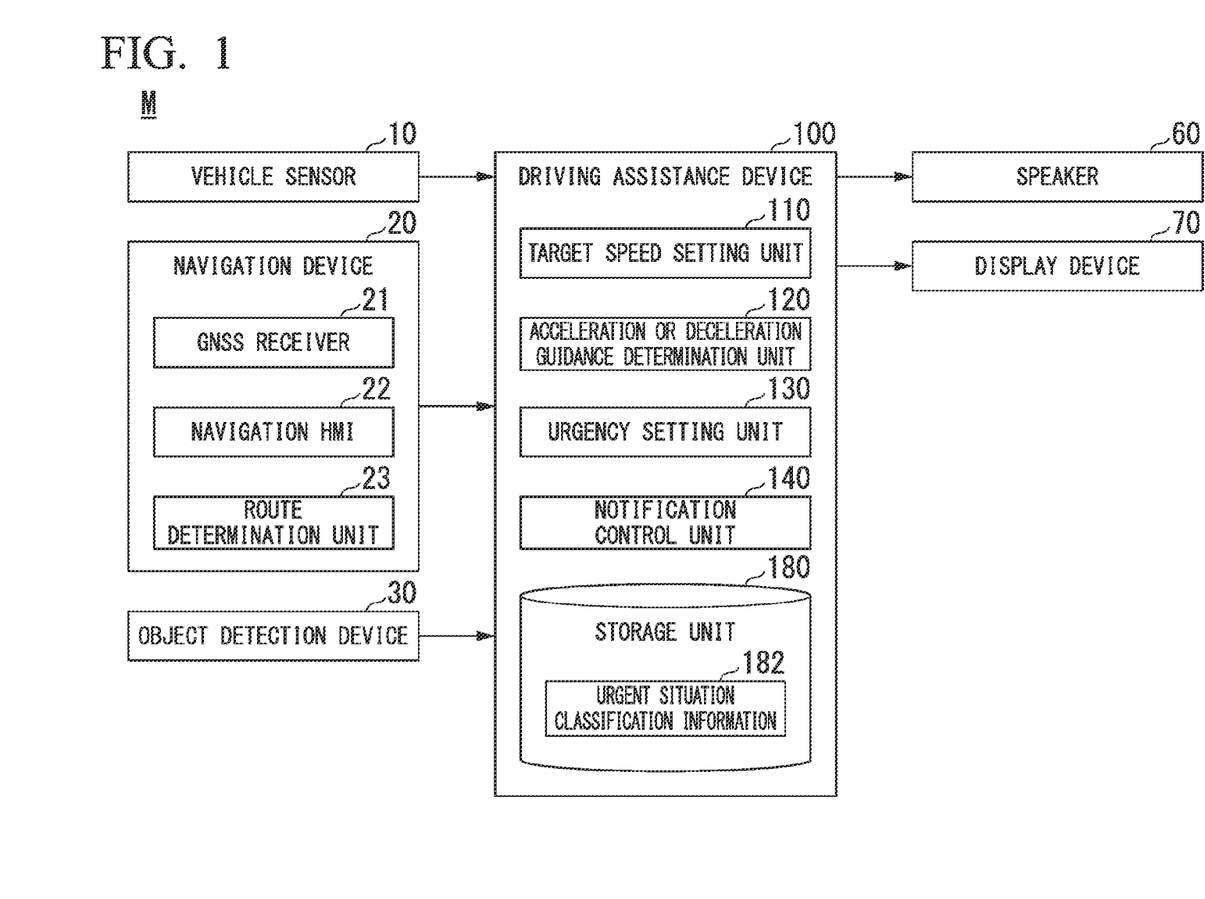
FIG. 1 is a diagram which shows a device that is mounted in a vehicle M, centering on a driving assistance device according to a first embodiment.

FIG. 1 is a diagram which shows devices mounted in a vehicle M centering on a driving assistance device 100 according to the first embodiment. The vehicle M may be an automobile having an internal combustion engine such as a diesel engine or a gasoline engine as a power source, an electric vehicle having an electric motor as a power source, or a hybrid vehicle having both an internal combustion engine and an electric motor. In the present embodiment, components for causing the vehicle M to travel, such as a driving operator, a driving device such as an engine and a motor, a steering device, a braking device, and the like will not be shown and described, but these components may be installed in the vehicle M.

The vehicle M is equipped with, for example, a vehicle sensor 10, a navigation device 20, an object detection device 30, a speaker 60, a display device 70, a driving assistance device 100, and the like.

The vehicle sensor 10 includes some or all of a vehicle speed sensor for detecting a speed of the vehicle M, an acceleration sensor for detecting acceleration, a yaw rate sensor for detecting an angular speed about the vertical axis, an orientation sensor for detecting a direction of the vehicle M, and a gradient sensor for detecting a gradient of a point where the vehicle M is present, and the like.

The navigation device 20 includes, for example, a global navigation satellite system (GNSS) receiver 21, a navigation HMI 22, and a route determination unit 23. The navigation device 20 holds map information in a storage device such as a hard disk drive (HDD) or flash memory. The GNSS receiver 21 specifies a position of the host vehicle M on the basis of a signal received from a GNSS satellite. The position of the vehicle M may be specified or complemented by an inertial navigation system (INS) using an output of the vehicle sensor 10. The navigation HMI 22 includes a display device, a speaker, a touch panel, a key, and the like. For example, the route determination unit 23 determines a route from the position of the vehicle M specified by the GNSS receiver 21 (or any position that is input) to a destination that is input by an occupant using the navigation HMI 22 (hereinafter referred to as a route on a map) with reference to map information. Map information is, for example, information in which road shapes are expressed by links indicating roads and nodes connected by the links. The map information may include a curvature or a gradient of a road, the number of lanes, a legal speed, type information (for example, an urban area, a high-speed road, a general national road, or the like, and information indicating whether a roadway and a sidewalk are clearly separated), point of interest (POI) information, and the like. The navigation device 20 may perform route guidance using the navigation HMI 22 on the basis of the route on the map. The navigation device 20 may be realized by, for example, connecting a terminal device such as a smart phone or a tablet terminal carried by the occupant with the driving assistance device 100 for communication. The navigation device 20 may transmit a current position and a destination to a navigation server via a communication device and acquire a route equivalent to the route on the map from the navigation server.

The object detection device 30 includes, for example, a camera, a radar device, a light detection and ranging (LIDAR), a sensor fusion device, and the like. The object detection device 30 detects types and positions of objects present in a periphery of the vehicle M (other vehicles, two-wheeled vehicles, bicycles, pedestrians, road markings, signs, markings, and the like) using known functions. The object detection device 30 may be capable of detecting the speed of an object.

The speaker 60 outputs a sound inside a vehicle compartment of the vehicle M. The speaker 60 may be a speaker unit including a plurality of child speakers, in which a position of a sound image may be arbitrarily set.

The display device 70 is, for example, a touch panel, and is attached to any place in a vehicle compartment of the vehicle M. The display device 70 receives various operations for the driving assistance device 100 and displays an image instructed by the driving assistance device 100 or the like.

[Driving Assistance Device]

The driving assistance device 100 includes, for example, a target speed setting unit 110, an acceleration or deceleration guidance determination unit 120, an urgency setting unit 130, a notification control unit 140, and a storage unit 180. Components other than the storage unit 180 are realized by a hardware processor such as a central processing unit (CPU) executing a program (software). Some or all of these components may be realized by hardware (a circuit unit; including circuitry) such as large scale integration (LSI), an application specific integrated circuit (ASIC), a field-programmable gate array (FPGA), or a graphics processing unit (GPU), or may also be realized by software and hardware in cooperation. The program may be stored in advance in a storage device (a storage device including a non-transitory storage medium) such as a hard disk drive (HDD) or flash memory, or may be stored in a removable storage medium such as a DVD or CD-ROM (a non-transitory storage medium), and may be installed by the storage medium being mounted in a drive device. Information such as urgent situation classification information 182 is stored in the storage unit 180. The acceleration or deceleration guidance determination unit 120 is an example of a determination unit.

The target speed setting unit 110 sets a target speed V # at which the vehicle M needs to travel. The target speed setting unit 110 acquires, for example, information on a legal speed from the navigation device 20 and sets the legal speed to the target speed V #. The target speed setting unit 110 may set the target speed V # to a value smaller than the legal speed according to the curvature and gradient of a road. In addition, the target speed setting unit 110 may set the target speed V # to a value smaller than the legal speed according to a degree of congestion of objects detected by the object detection device 30. For example, when the object detection device 30 detects pedestrians equal to or more than a threshold value on a road where the roadway and the sidewalk are not clearly separated, the target speed setting unit 110 may set the target speed V # to a value smaller than the legal speed to slow down voluntarily. Information indicating that the vehicle M is moving on a road where the roadway and the sidewalk are not clearly separated may be acquired from the navigation device 20, or an image captured by the camera of the object detection device 30 may be acquired by the driving assistance device 100 analyzing it.

The acceleration or deceleration guidance determination unit 120 determines whether to urge the driver of the vehicle M to accelerate or decelerate on the basis of a state of the vehicle M. The state herein includes, for example, a speed V and a target speed #. For example, the acceleration or deceleration guidance determination unit 120 determines whether to urge the driver of the vehicle M to accelerate or decelerate on the basis of a comparison between the speed V of the vehicle M and the target speed V #. For example, the acceleration or deceleration guidance determination unit 120 determines to urge the driver of the vehicle M to decelerate when the speed V is greater than the target speed V # and their difference is equal to or greater than a threshold value, determines to urge the driver of the vehicle M to decelerate when the speed V is less than the target speed V # and their difference is equal to or greater than the threshold value, and determines not to urge the driver of the vehicle M to either accelerate or decelerate when the difference between the speed V and the target speed V # is less than the threshold value. The acceleration or deceleration guidance determination unit 120 may determine whether to encourage acceleration or deceleration on the basis of the curvature and gradient of the road, the degree of congestion in the periphery of the vehicle M, and the like.

Furthermore, the acceleration or deceleration guidance determination unit 120 may determine a degree to which to urge the driver of the vehicle M to perform acceleration or deceleration. For example, the acceleration or deceleration guidance determination unit 120 determines the degree to which to urge the driver of the vehicle M to perform acceleration or deceleration in two stages, large and small. For example, the acceleration or deceleration guidance determination unit 120 determines the degree to which to urge the driver of the vehicle M to perform acceleration or deceleration to be large when the difference (an absolute value) between the speed V and the target speed V # is equal to or greater than a reference value (which is greater than the threshold value described above), and determines the degree to which to urge the driver of the vehicle M to perform acceleration or deceleration to be small when the difference is less than the reference value.

Figure 2:
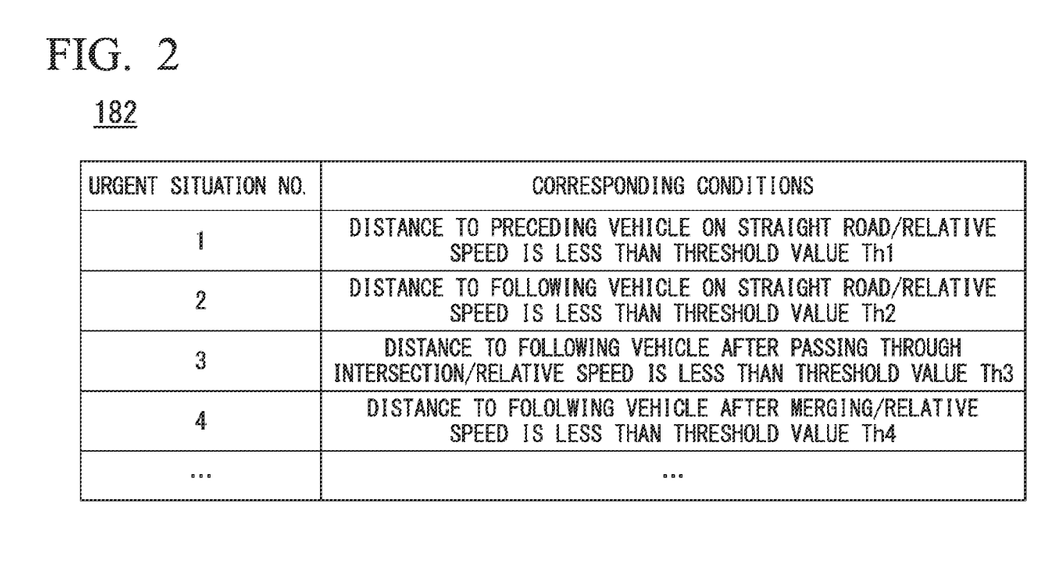
FIG. 2 is a diagram which shows an example of content of urgent situation classification information.

The urgency setting unit 130 sets an urgency of speed adjustment of the vehicle M on the basis of information indicating a surrounding environment of the vehicle M. The information indicating the surrounding environment is, for example, a relative position and a speed relationship (a relative speed) with a preceding vehicle and a following vehicle, a situation in which the vehicle M is placed, and the like. Regarding the relative speed, a direction in which both approach each other is set to be positive. A preceding vehicle is a vehicle that is ahead of the vehicle M and is moving in the same lane as the vehicle M in the same direction. A following vehicle is a vehicle that is behind the vehicle M and is moving in the same lane as the vehicle M in the same direction. The situation in which the vehicle is placed is information such as whether the vehicle M is moving on a straight road or has just passed through an intersection (within a predetermined distance after passing). The urgency setting unit 130 refers to, for example, the information indicating the surrounding environment of the vehicle M and the urgent situation classification information 182, and sets the urgency of the speed adjustment of the vehicle M in two stages, high and low. FIG. 2 is a diagram which shows an example of content of the urgent situation classification information 182. The urgent situation classification information 182 is a list of conditions under which the urgency is set to be high. The urgency setting unit 130 sets, for example, the urgency to be high when various types of information described above meet the conditions listed in the urgent situation classification information 182, and sets the urgency to be low when they do not meet the conditions. Threshold values Th1 to Th4 to be shown may be different from each other, or some of them may be the same.

[Notification Sound]

The notification control unit 140 causes the speaker 60 to output a notification sound on the basis of a result of the determination by the acceleration or deceleration guidance determination unit 120 and the urgency. In addition, the driving assistance device 100 of the present embodiment may cause the speaker 60 to output a notification sound without considering the urgency, and in this case, the urgency setting unit 130 and the urgent situation classification information 182 may be omitted. The notification control unit 140 causes the speaker 60 to output a notification sound via a device capable of generating and synthesizing desired sounds, such as a synthesizer.

The notification control unit 140 first causes the speaker 60 to output a fundamental sound BS, and then causes the speaker 60 to output one or more additional sounds AS whose pitch is different from that of the fundamental sound BS. For example, the notification control unit 140 causes the speaker 60 to output one or more additional sounds AS whose pitch is higher than that of the fundamental sound BS when the driver of the vehicle M is urged to accelerate, and causes the speaker 60 to output one or more additional sounds AS whose pitch is lower than that of the fundamental sound BS when the driver of the vehicle M is urged to decelerate.

Furthermore, the notification control unit 140 may cause the speaker 60 to output one or more additional sounds AS in order of the pitch closest to that of the fundamental sound BS. In addition, as the degree to which to urge the driver of the vehicle M to perform acceleration or deceleration increases, the notification control unit 140 may increase a pitch difference between the fundamental sound BS and the additional sounds AS whose pitch is farthest from that of the fundamental sound BS among the one or more additional sounds AS. In addition, as the degree to which to urge the driver of the vehicle M to perform acceleration or deceleration increases, the notification control unit 140 may increase the types (pitches) of the one or more additional sounds AS. Moreover, as the degree to which to urge the driver of the vehicle M to perform acceleration or deceleration increases, the notification control unit 140 may shorten an interval of an output start timing of the fundamental sound BS and the one or more additional sounds AS. The fundamental sound BS and the one or more additional sounds AS are, for example, sounds that fall within one octave.

When a notification sound is output in consideration of the urgency, the notification control unit 140 causes, for example, the speaker 60 to output one or more additional sounds AS that are dissonant with the fundamental sound BS when the urgency set by the urgency setting unit 130 is high, and causes the speaker 60 to output one or more additional sounds AS that are consonant with the fundamental sound BS when the urgency is low.

Specific Example

Processing of the notification control unit 140 will be described below with reference to the drawings. FIGS. 3 to 10 are diagrams which exemplify sounds that the notification control unit 140 causes the speaker 60 to output depending on whether the driver is urged to accelerate or decelerate, the urgency, and each degree to which to encourage acceleration or deceleration. In FIGS. 3 to 10, light hatching indicates a whole tone, and thick hatching indicates a semitone. In addition, when there are a plurality of types of additional sound AS, they are represented as additional sound AS-1, AS-2, and so on.

Figure 3:
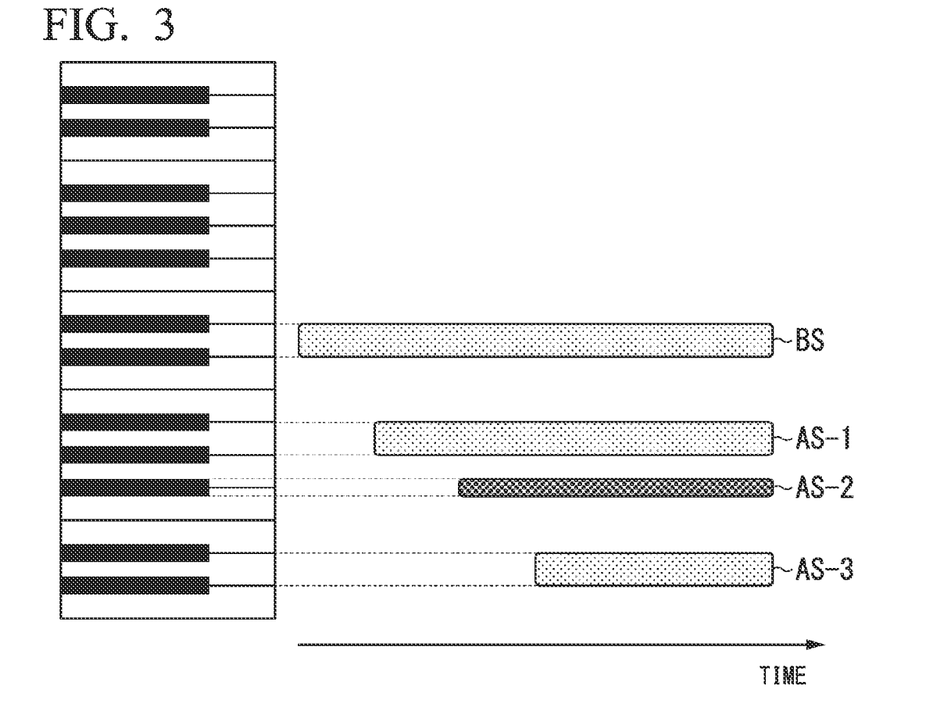
FIG. 3 is a diagram which shows a mode of a notification sound when the urgency is low and a degree to which to encourage deceleration is large in a situation in which a driver of the vehicle M is urged to decelerate.

FIG. 3 is a diagram which shows a mode of a notification sound when the urgency is low and the degree to which to encourage deceleration is large in a situation that the driver of the vehicle M is urged to decelerate. As shown in FIG. 3, the notification control unit 140 selects a pitch so that the fundamental sound BS and the additional sound AS form a consonant sound such as D major, and causes the speaker 60 to output the additional sounds AS-1, AS-2, and AS-3 while an output of the fundamental sound BS continues. In this example, the pitch decreases in order of the fundamental sound BS and the additional sounds AS-1, AS-2, and AS-3, and an additional sound AS-3 is a sound one octave below the fundamental sound BS.

Figure 4:
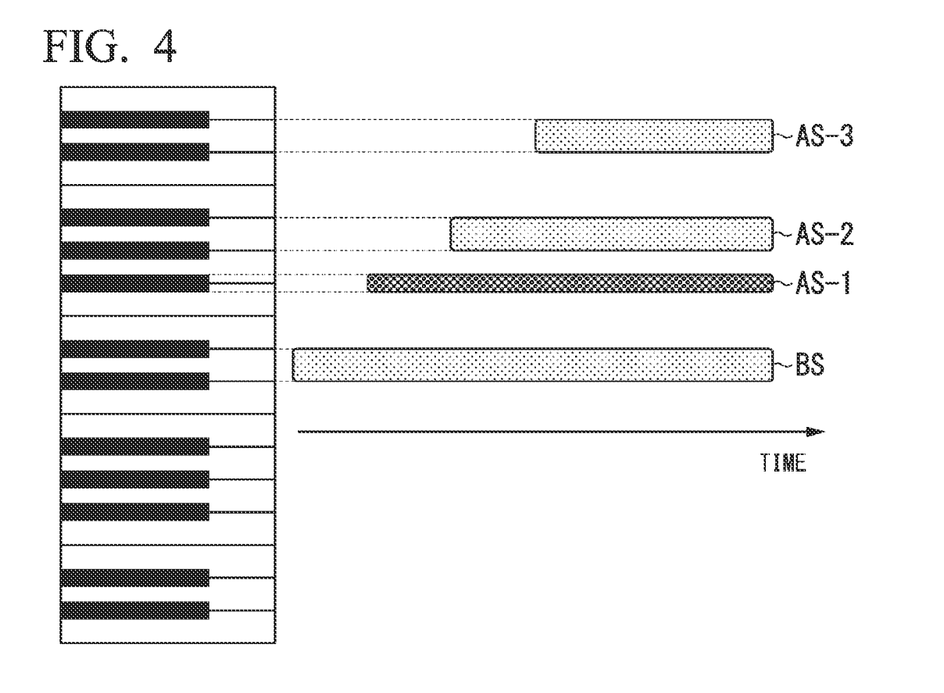
FIG. 4 is a diagram which shows a mode of a notification sound when the urgency is low and a degree to which to encourage deceleration is large in a situation in which the driver of the vehicle M is urged to accelerate.

FIG. 4 is a diagram which shows the mode of a notification sound when the urgency is low and the degree to which to encourage acceleration is large in a situation that the driver of the vehicle M is urged to accelerate. As shown in FIG. 4, the notification control unit 140 selects a pitch so that the fundamental sound BS and the additional sound AS form the consonant sound such as D major, and causes the speaker 60 to output the additional sounds AS-1, AS-2, and AS-3 while the output of the fundamental sound BS continues. In this example, the pitch increases in the order of the fundamental sound BS and the additional sounds AS-1, AS-2, and AS-3, and the additional sound AS-3 is one octave above the fundamental sound BS.

Figure 5:
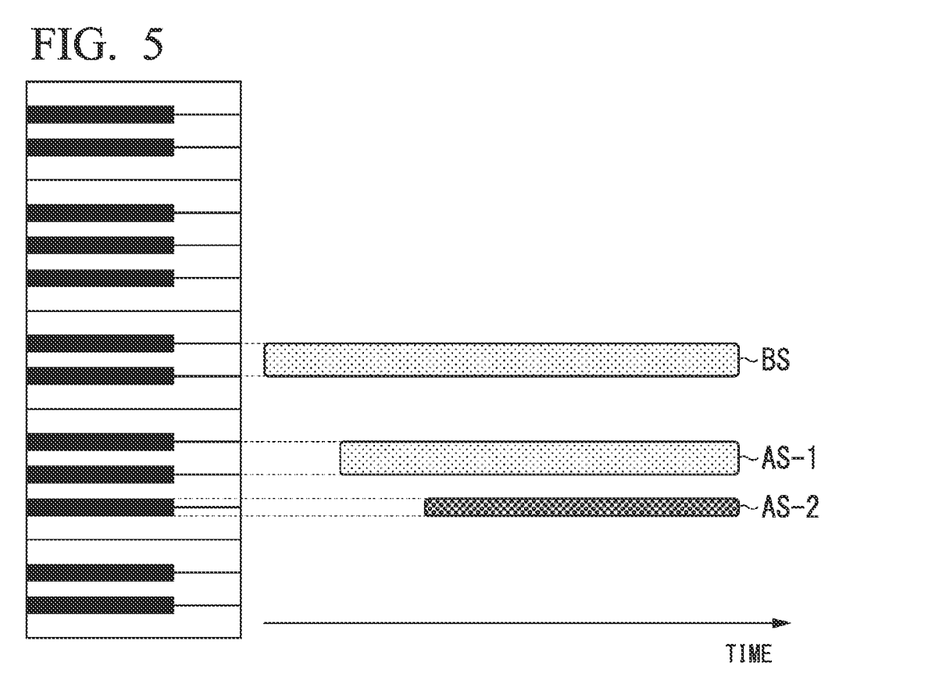
FIG. 5 is a diagram which shows a mode of a notification sound when the urgency is low and a degree to which to encourage deceleration is small in a situation in which the driver of the vehicle M is urged to decelerate.

FIG. 5 is a diagram which shows the mode of a notification sound when the urgency is low and the degree to which to encourage deceleration is small in the situation that the driver of the vehicle M is urged to decelerate. As shown in FIG. 5, the notification control unit 140 selects a pitch so that the fundamental sound BS and the additional sound AS form the consonant sound such as D major, and causes the speaker 60 to output the additional sounds AS-1, and AS-2, which are smaller than a case where the degree to which to encourage deceleration is large, while the output of the fundamental sound BS continues. In this example, the pitch decreases in order of the fundamental sound BS and the additional sounds AS-1, and AS-2, and an additional sound AS-2 is a sound higher than the sound one octave below the fundamental sound BS (in other words, a sound closer to the fundamental sound BS as compared to the example in FIG. 3).

Figure 6:
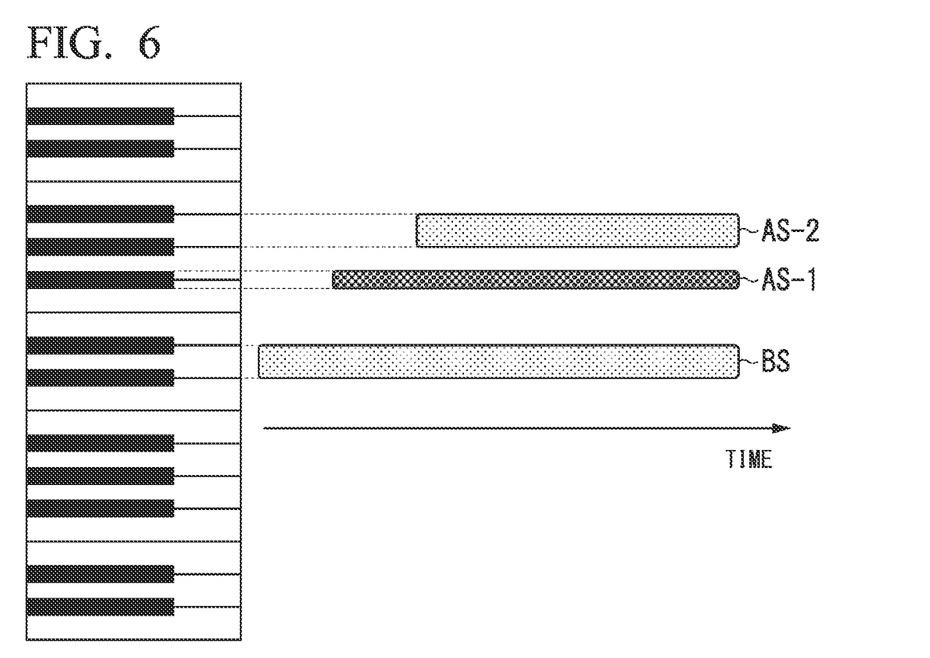
FIG. 6 is a diagram which shows a mode of a notification sound when the urgency is low and a degree to which to encourage acceleration is small in a situation in which the driver of the vehicle M is urged to accelerate.

FIG. 6 is a diagram which shows the mode of a notification sound when the urgency is low and the degree to which to encourage acceleration is small in the situation that the driver of the vehicle M is urged to accelerate. As shown in FIG. 6, the notification control unit 140 selects a pitch so that the fundamental sound BS and the additional sound AS form the consonant sound such as D major, and causes the speaker 60 to output the additional sounds AS-1 and AS-2, which are smaller than a case where the degree to which to encourage acceleration is large, while the output of the fundamental sound BS continues. In this example, the pitch increases in the order of the fundamental sound BS and the additional sounds AS-1, and AS-2, and the additional sound AS-3 is a sound lower than the sound one octave above the fundamental sound BS (in other words, a sound closer to the fundamental sound BS as compared to the example in FIG. 4).

Figure 7:
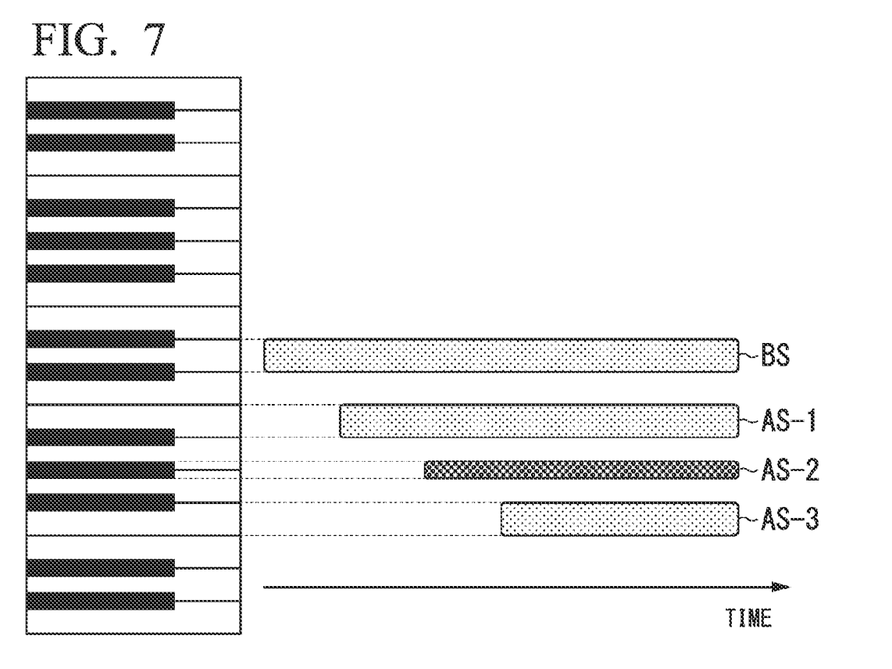
FIG. 7 is a diagram which shows a mode of a notification sound when the urgency is high and a degree to which to encourage deceleration is large in a situation in which the driver of the vehicle M is urged to decelerate.

FIG. 7 is a diagram which shows the mode of a notification sound when the urgency is high and the degree to which to encourage deceleration is large in the situation that the driver of the vehicle M is urged to decelerate. As shown in FIG. 7, the notification control unit 140 selects a pitch so that the fundamental sound BS and the additional sound AS form a dissonant sound such as D diminished, and causes the speaker 60 to output the additional sound AS-1, AS-2, and AS-3 while the output of the fundamental sound BS continues. In this example, the pitch decreases in the order of the fundamental sound BS and the additional sounds AS-1, AS-2, and AS-3, and additional sound AS-3 is a sound higher than the sound one octave below fundamental sound BS.

Figure 8:
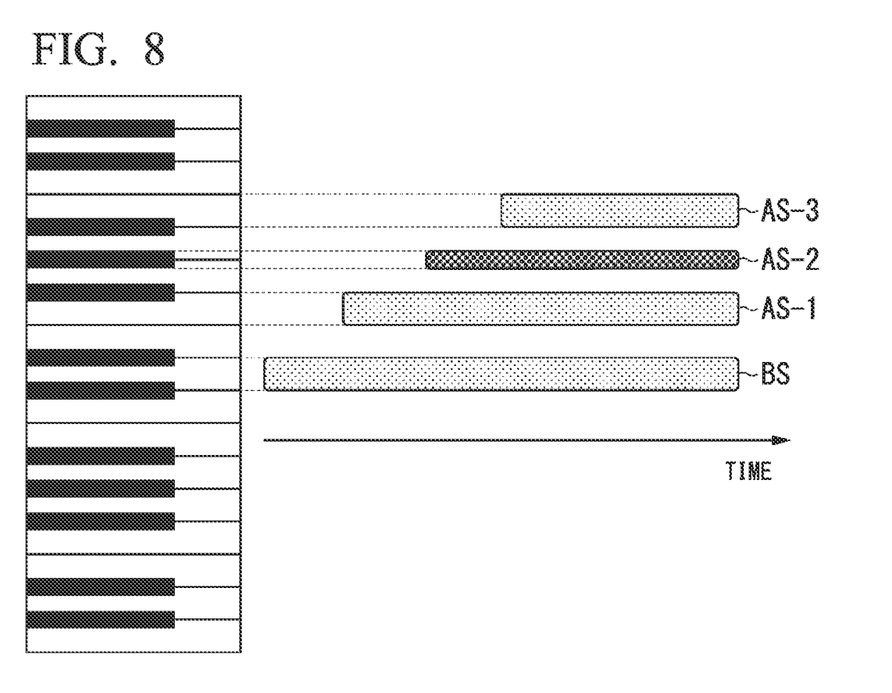
FIG. 8 is a diagram which shows a mode of a notification sound when the urgency is high and a degree to which to encourage deceleration is large in a situation in which the driver of the vehicle M is urged to accelerate.

FIG. 8 is a diagram which shows the mode of a notification sound when the urgency is high and the degree to which to encourage deceleration is large in the situation that the driver of the vehicle M is urged to accelerate. As shown in FIG. 8, the notification control unit 140 selects a pitch so that the fundamental sound BS and the additional sound AS form the dissonant sound such as D diminished, and causes the speaker 60 to output the additional sound AS-1, AS-2, and AS-3 while the output of the fundamental sound BS continues. In this example, the pitch increases in the order of the fundamental sound BS and additional sounds AS-1, AS-2, and AS-3, and the additional sound AS-3 is a sound lower than the sound one octave above the fundamental sound BS.

Figure 9:
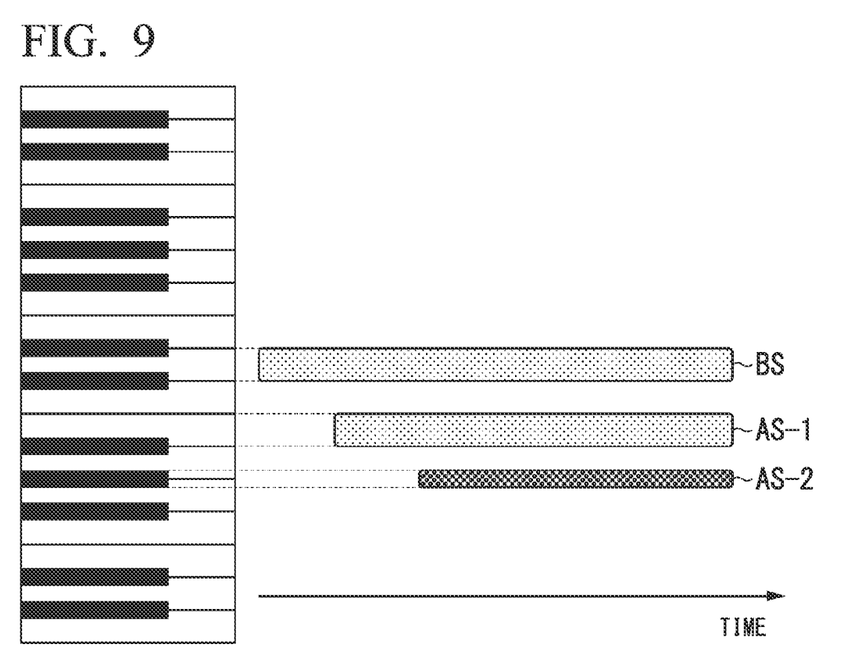
FIG. 9 is a diagram which shows a mode of a notification sound when the urgency is high and a degree to which to encourage deceleration is small in a situation in which the driver of the vehicle M is urged to decelerate.

FIG. 9 is a diagram which shows the mode of a notification sound when the urgency is high and the degree to which to encourage acceleration is small in the situation that the driver of the vehicle M is urged to decelerate. As shown in FIG. 9, the notification control unit 140 selects a pitch so that the fundamental sound BS and the additional sound AS form the dissonant sound such as D diminished, and causes the speaker 60 to output the additional sounds AS-1 and AS-2, which are smaller than the case where the degree to which to encourage deceleration is large, while the output of the fundamental sound BS continues. In this example, the pitch decreases in the order of the fundamental sound BS and the additional sounds AS-1 and AS-2, and the additional sound AS-2 is a sound closer to the fundamental sound BS as compared to the additional sound AS-3 in FIG. 7.

Figure 10:
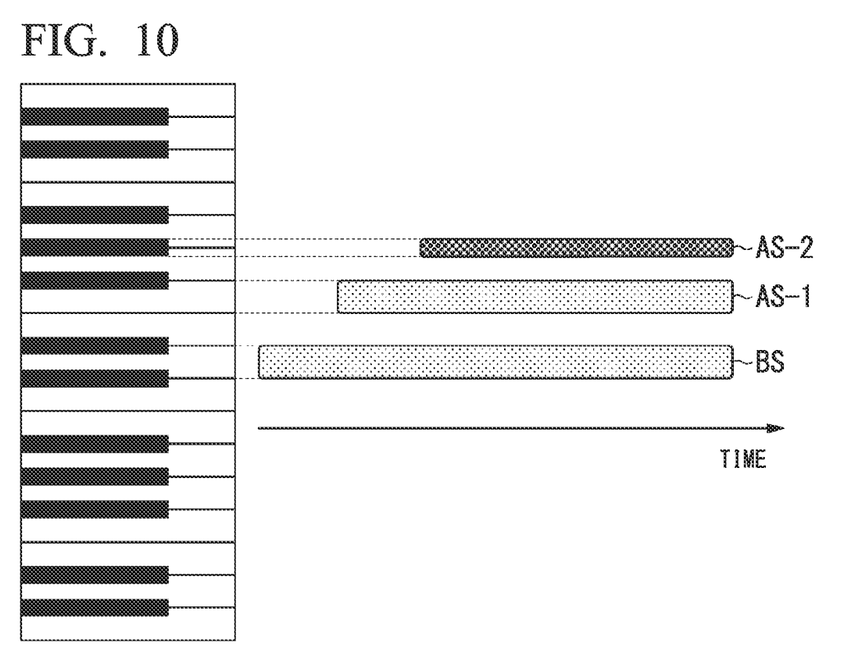
FIG. 10 is a diagram which shows a mode of a notification sound when the urgency is high and a degree to which to encourage acceleration is small in a situation in which the driver of the vehicle M is urged to accelerate.

FIG. 10 is a diagram which shows the mode of a notification sound when the urgency is high and the degree to which to encourage acceleration is small in the situation that the driver of the vehicle M is urged to accelerate. As shown in FIG. 10, the notification control unit 140 selects a pitch so that the fundamental sound BS and the additional sound AS form the dissonant sound such as D diminished, and causes the speaker 60 to output the additional sounds AS-1 and AS-2, which are smaller than the case where the degree to which to encourage acceleration is large while the output of the fundamental sound BS continues. In this example, the pitch increases in the order of the fundamental sound BS and the additional sounds AS-1 and AS-2, and the additional sound AS-3 is a sound closer to the fundamental sound BS as compared to the additional sound AS-3 in FIG. 8.

The notification control unit 140 causes the speaker 60 to repeatedly output notification sounds in the modes exemplified in FIGS. 3 to 10 until the state of the vehicle M changes.

Figure 11:
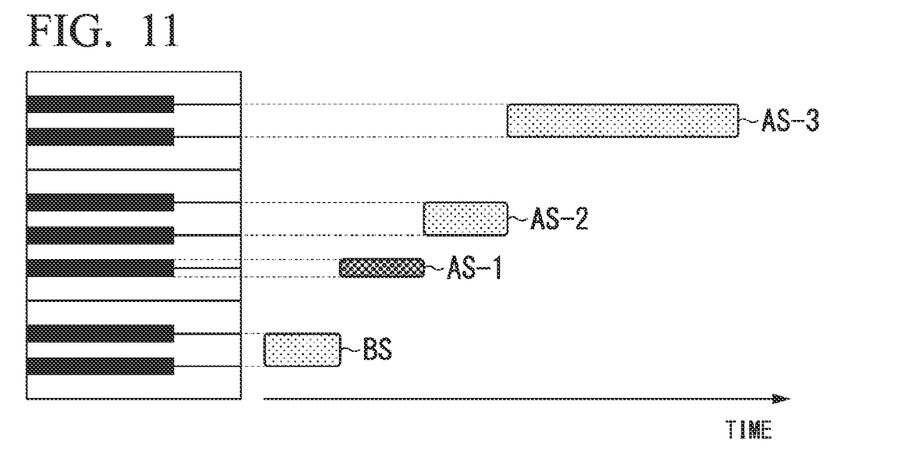
FIG. 11 is a diagram which shows another example of output periods of a fundamental sound and an additional sound.
Figure 12:
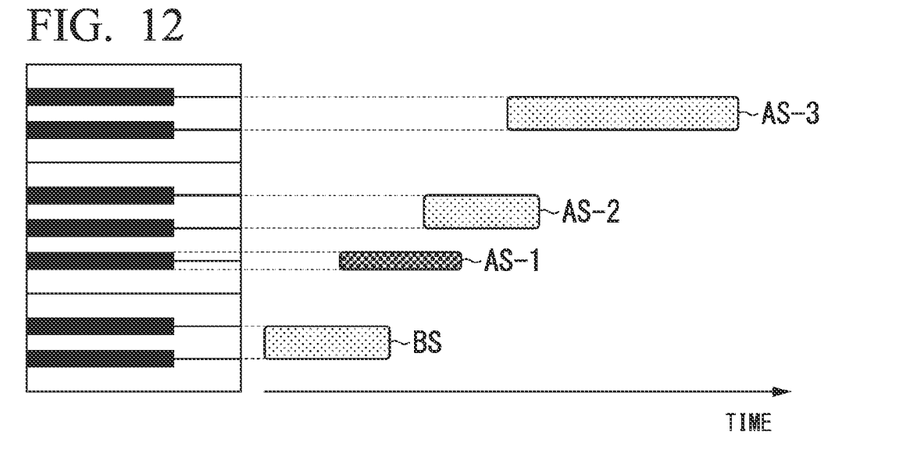
FIG. 12 is a diagram which shows another example of the output periods of a fundamental sound and an additional sound.
Figure 13:
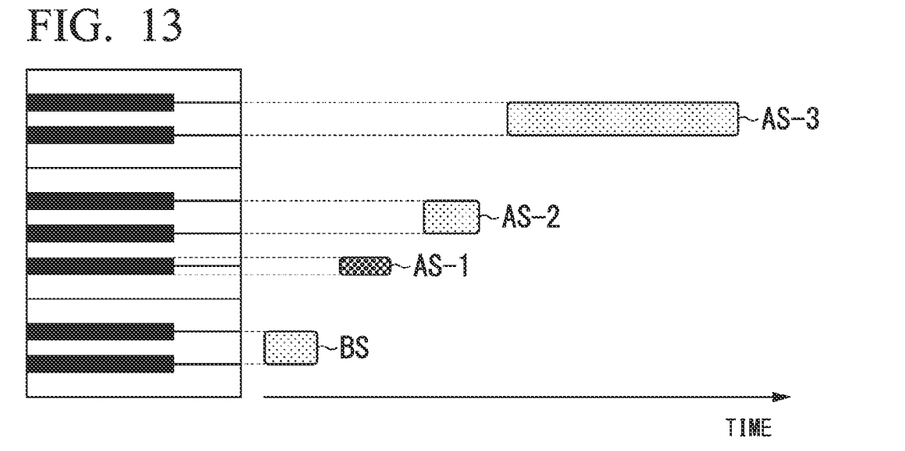
FIG. 13 is a diagram which shows still another example of the output periods of a fundamental sound and an additional sound.

In the examples of FIGS. 3 to 10, the speaker 60 is caused to output the additional sound AS while the output of the fundamental sound BS continues, that is, it is assumed that the speaker 60 is caused to output a notification sound in a mode of an arpeggio, but the present invention is not limited thereto, and output periods of the fundamental sound BS and the additional sound AS (focusing on one output in repeated outputs) can be changed as follows. FIGS. 11 to 13 are diagrams which show other examples of the output periods of the fundamental sound BS and the additional sound AS.

As shown in FIG. 11, the notification control unit 140 may cause each of the fundamental sound BS and the additional sounds AS-1, AS-2, and AS-3 to form a broken chord in a form of outputting a next notification sound at a timing when an output of the previous notification sound stops.

As shown in FIG. 12, the notification control unit 140 may cause each of the fundamental sound BS and the additional sounds AS-1, AS-2, and AS-3 to form a broken chord with a layered tone in a form of outputting a next notification sound a little before the output of the previous notification sound stops.

As shown in FIG. 13, the notification control unit 140 may cause each of the fundamental sound BS and the additional sounds AS-1, AS-2, and AS-3 to form a broken chord that separates notes in a form of outputting a next notification sound a little after the output of the previous notification sound has stopped.

[Output Interval]

Figure 14:
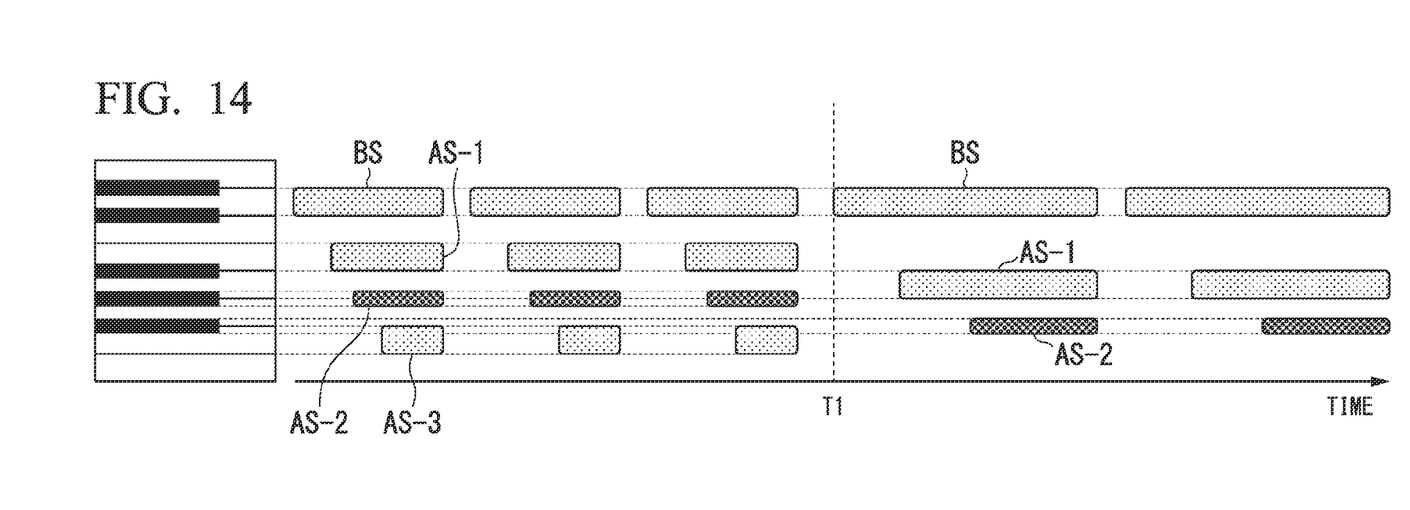
FIG. 14 is a diagram which exemplifies changing an output cycle of a notification sound.

The notification control unit 140 may change an output cycle of a notification sound according to the urgency. For example, the notification control unit 140 may shorten the output cycle of a notification sound when the urgency is high as compared to when the urgency is low. FIG. 14 is a diagram which exemplifies changing the output cycle of a notification sound. In the shown example, the urgency is set to be high by a timing T1 and the urgency is changed to be low after the timing T1 in the situation where the driver of the vehicle M is urged to decelerate. With each of the measures described above, a condition in which the vehicle M is placed can be intuitively conveyed to the driver.

According to the first embodiment described above, it is possible to intuitively convey the driver of the guidance content of acceleration or deceleration by determining whether to urge the driver of the vehicle M to accelerate or decelerate on the basis of the state of the vehicle M, causing the speaker 60 to output a notification sound urging the driver of the vehicle M to accelerate or decelerate on the basis of a result of the determination, and at that time, causing the speaker 60 to output a fundamental sound first and to output one or more additional sounds whose pitch is different from that of the fundamental sound. In particular, the driver can intuitively recognize that acceleration is being instructed by setting the additional sound AS to a sound having higher pitch than that of the fundamental sound BS, and the driver can intuitively recognize that deceleration is being instructed by setting the additional sound AS to a sound having lower pitch than that of the fundamental sound BS.

Second Embodiment

Figure 15:
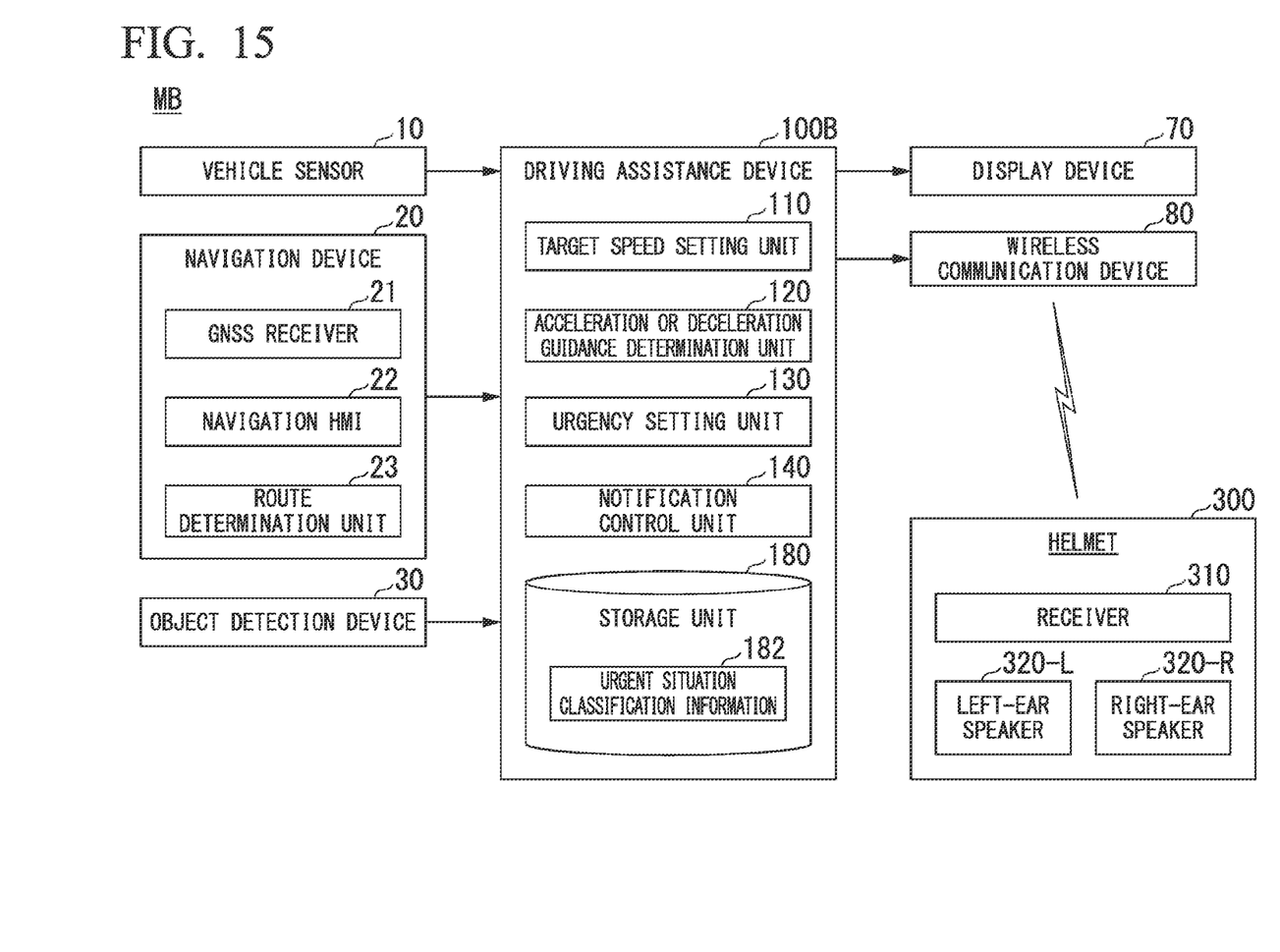
FIG. 15 is a diagram which shows a device mounted in a two-wheeled vehicle, centering on a driving assistance device according to a second embodiment.

The second embodiment will be described below. The driving assistance device of the second embodiment is mounted in a two-wheeled vehicle in which the driver wears a helmet. FIG. 15 is a diagram which shows devices mounted in a two-wheeled vehicle MB centering on a driving assistance device 100B according to the second embodiment. Instead of controlling the speaker 60, the driving assistance device 100B instructs a wireless communication device 80 to transmit instruction information regarding a notification sound. The wireless communication device 80 performs communication on the basis of a communication standard such as Bluetooth (a registered trademark).

A receiver 310, a left-ear speaker 320-L, and a right-ear speaker 320-R are attached to the helmet 300 worn by the driver. The receiver 310 causes one or both of the left-ear speaker 320-L and the right-ear speaker 320-R to output a notification sound on the basis of instruction information received from the wireless communication device 80.

Control of a notification sound is the same as in the first embodiment. In the second embodiment, an earphone with a wireless function may be used instead of the speaker provided in the helmet.

According to the second embodiment described above, the same effects as those of the first embodiment can be obtained.

As described above, a mode for carrying out the present invention has been described using the embodiments, but the present invention is not limited to such embodiments at all, and various modifications and replacements can be added within a range not departing from the gist of the present invention.

What is claimed is:

1. A driving assistance device comprising:
 a storage unit medium configured to store computer-readable instructions; and
 a processor connected to the storage unit,
 wherein the processor executes the computer-readable instructions to
 determine whether to urge a driver of a mobile object to accelerate or decelerate on the basis of a state of the mobile object,
 cause a speaker to output a notification sound urging the driver of the mobile object to accelerate or decelerate on the basis of a result of the determination,
 cause the speaker to output a fundamental sound when causing the speaker to output the notification sound, the output of the fundamental sound being started at a first point in time,
 cause the speaker to output one or more additional sounds whose pitch is different from a pitch of the fundamental sound, the output of the additional sounds being started at a second point in time, the second point in time being later than the first point in time, and
 cause the speaker to output the one or more additional sounds whose pitch is higher than the pitch of the fundamental sound when the driver of the mobile object is urged to accelerate.

2. The driving assistance device according to claim 1, wherein the processor causes the speaker to output one or more additional sounds whose pitch is different from the pitch of the fundamental sound while an output of the fundamental sound continues.

3. The driving assistance device according to claim 1, wherein the processor causes the speaker to output the one or more additional sounds in order of the pitch closest to the pitch of the fundamental sound.

4. The driving assistance device according to claim 3, wherein the processor increases a pitch difference between the fundamental sound and one of the one or more additional sounds, the pitch of which is farthest from the pitch of the fundamental sound, as a degree to which the driver of the mobile object is urged to perform acceleration or deceleration increases.

5. The driving assistance device according to claim 3,
wherein the processor increases the number of types of the one or more additional sounds as the degree to which the driver of the mobile object is urged to perform acceleration or deceleration increases.

6. The driving assistance device according to claim 3,
wherein the processor shortens an interval of an output start timing of the fundamental sound and the one or more additional sounds as the degree to which the driver of the mobile object is urged to perform acceleration or deceleration increases.

7. The driving assistance device according to claim 3,
wherein the fundamental sound and the one or more additional sounds are sounds that fall within one octave.

8. The driving assistance device according to claim 1,
wherein the processor further sets an urgency of a speed adjustment of the mobile object on the basis of information indicating a surrounding environment of the mobile object,
causes the speaker to output the one or more additional sounds that are dissonant with the fundamental sound when the urgency is high, and causes the speaker to output the one or more additional sounds that are consonant with the fundamental sound when the urgency is low.

9. The driving assistance device according to claim 8,
wherein the processor shortens an output cycle of the notification sound when the urgency is high compared to when the urgency is low.

10. A driving assistance device comprising:
a storage unit configured to store computer-readable instructions; and
a processor connected to the storage unit,
wherein the processor executes the computer-readable instructions to
determine whether to urge a driver of a mobile object to accelerate or decelerate on the basis of a state of the mobile object,
cause a speaker to output a notification sound urging the driver of the mobile object to accelerate or decelerate on the basis of a result of the determination,
cause the speaker to output a fundamental sound when causing the speaker to output the notification sound, the output of the fundamental sound being started at a first point in time,
cause the speaker to output one or more additional sounds whose pitch is different from a pitch of the fundamental sound, the output of the additional sounds being started at a second point in time, the second point in time being later than the first point in time, and
cause the speaker to output the one or more additional sounds whose pitch is lower than the pitch of the fundamental sound when the driver of the mobile object is urged to decelerate.

11. The driving assistance device according to claim 10,
wherein the processor causes the speaker to output one or more additional sounds whose pitch is different from the pitch of the fundamental sound while the output of the fundamental sound continues.

12. The driving assistance device according to claim 10,
wherein the processor causes the speaker to output the one or more additional sounds in the order of the pitch closest to the pitch of the fundamental sound.

13. The driving assistance device according to claim 12,
wherein the processor increases the pitch difference between the fundamental sound and one of the one or more additional sounds, the pitch of which is farthest from the pitch of the fundamental sound, as the degree to which the driver of the mobile object is urged to perform acceleration or deceleration increases.

14. The driving assistance device according to claim 12,
wherein the processor increases the number of types of the one or more additional sounds as the degree to which the driver of the mobile object is urged to perform acceleration or deceleration increases.

15. The driving assistance device according to claim 12,
wherein the processor shortens an interval of an output start timing of the fundamental sound and the one or more additional sounds as the degree to which the driver of the mobile object is urged to perform acceleration or deceleration increases.

16. The driving assistance device according to claim 12,
wherein the fundamental sound and the one or more additional sounds are sounds that fall within one octave.

17. The driving assistance device according to claim 10,
wherein the processor further sets an urgency of a speed adjustment of the mobile object on the basis of information indicating a surrounding environment of the mobile object,
causes the speaker to output the one or more additional sounds that are dissonant with the fundamental sound when the urgency is high, and causes the speaker to output the one or more additional sounds that are consonant with the fundamental sound when the urgency is low.

18. The driving assistance device according to claim 17,
wherein the processor shortens the output cycle of the notification sound when the urgency is high compared to when the urgency is low.

19. A driving assistance method executed by a driving assistance device, comprising:
determining whether to urge a driver of a mobile object to accelerate or decelerate on the basis of a state of the mobile object;
causing a speaker to output a notification sound urging the driver of the mobile object to accelerate or decelerate on the basis of a result of the determination;
causing the speaker to output a fundamental sound when causing the speaker to output the notification sound, the output of the fundamental sound being started at a first point in time; and then
causing the speaker to output one or more additional sounds whose pitch is different from a pitch of the fundamental sound, the output of the additional sounds being started at a second point in time, the second point in time being later than the first point in time; and
causing the speaker to output the one or more additional sounds whose pitch is higher than the pitch of the fundamental sound when the driver of the mobile object is urged to accelerate.

20. A driving assistance method executed by a driving assistance device, comprising:
determining whether to urge a driver of a mobile object to accelerate or decelerate on the basis of a state of the mobile object;
causing a speaker to output a notification sound urging the driver of the mobile object to accelerate or decelerate on the basis of a result of the determination;
causing the speaker to output a fundamental sound when causing the speaker to output the notification sound, the output of the fundamental sound being started at a first point in time;

causing the speaker to output one or more additional sounds whose pitch is different from a pitch of the fundamental sound, the output of the additional sounds being started at a second point in time, the second point in time being later than the first point in time; and causing the speaker to output the one or more additional sounds whose pitch is lower than the pitch of the fundamental sound when the driver of the mobile object is urged to accelerate.

\* \* \* \* \*